H. O. SCRANTON.
ROTARY EARTHWORKING ELEMENT.
APPLICATION FILED MAR. 11, 1919.
1,325,416.
Patented Dec. 16, 1919.
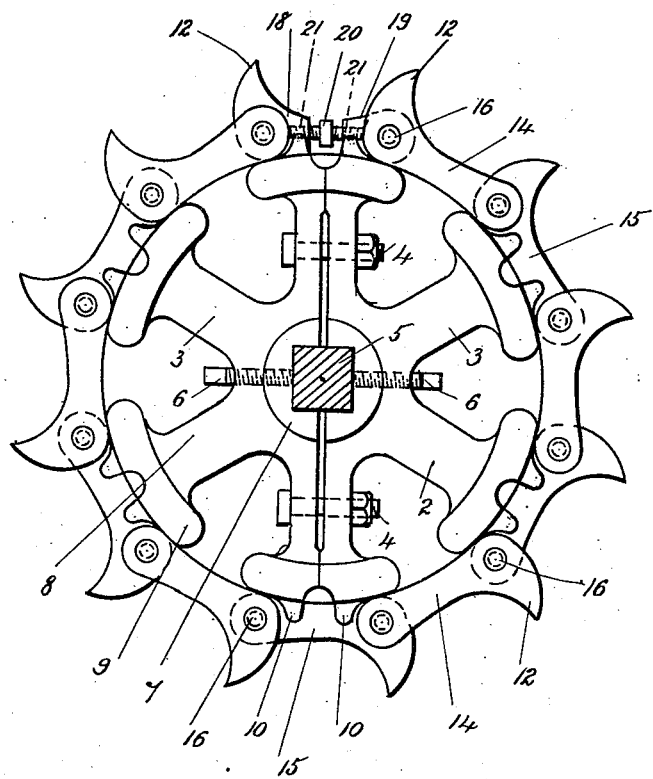
FIG_1_
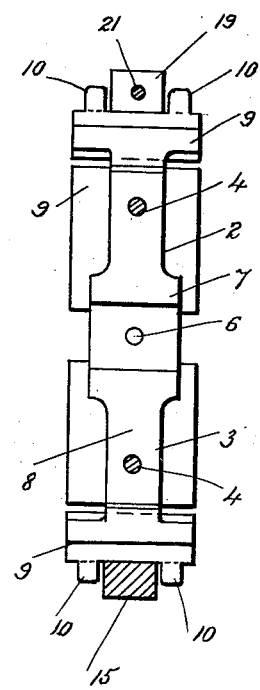
FIG_2_
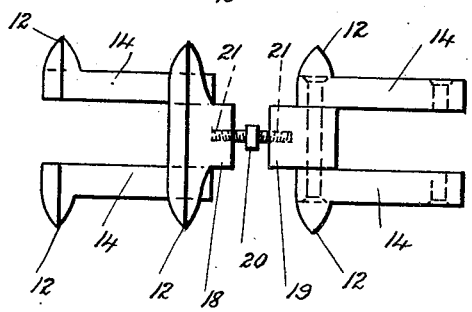
FIG_3_
Inventor
Henry O. Scranton
by Herbert W. Jenner
Attorney.

UNITED STATES PATENT OFFICE.

HENRY OSBERT SCRANTON, OF JEANERETTE, LOUISIANA.

ROTARY EARTHWORKING ELEMENT.

1,325,416.  Specification of Letters Patent.  Patented Dec. 16, 1919.

Application filed March 11, 1919. Serial No. 281,980.

*To all whom it may concern:*

Be it known that I, HENRY O. SCRANTON, a citizen of the United States, residing at Jeanerette, in the parish of Iberia and State of Louisiana, have invented certain new and useful Improvements in Rotary Earthworking Elements, of which the following is a specification.

This invention relates to rotary devices for working in earth and specially adapted for use on clod crushing machines but which may be used on other agricultural implements: and it consists of a central support provided with renewable teeth secured around it as hereinafter fully described and claimed.

In the drawings, Figure 1 is a side view of the earth working element. Fig. 2 is an end view of one-half of the element showing some of the teeth. Fig. 3 is a plan view of certain of the teeth and links.

A central support or spider 2 is provided and is formed of two halves 3, or is otherwise constructed of sections, which are secured together by bolts 4. These sections are clamped upon a driving shaft 5, which is preferably square in cross-section. As many similar spiders as desired are clamped side by side on the shaft so that a toothed cylinder may be formed which is suitable for use in a clod crushing machine. The spiders may be spaced at any suitable distances apart on the shaft, and they are provided with set-screws 6 to prevent them from sliding longitudinally. The spider has a central hub 7, and is preferably provided with radial arms 8 having enlargements 9 at their ends. Lugs 10 project outwardly from the middle portions of the enlargements 9.

The teeth 12 are formed on links 14 and 15, which are pivoted together by pins 16 in a similar manner to the links of a drive chain. The teeth of the outer links 14 are formed right and left, the teeth being wider at their points than at their bases where they join onto the links.

The teeth of the middle links 15 are also widest at their points, and they project laterally on each side of their links. The middle links 15 rest on the enlargements 9 between the lugs 10, and the lugs 10 engage loosely with the ends of the outer links 14.

One of the middle links is formed of two end parts 18 and 19 connected together by a turnbuckle 20, or any other similar fastening device. The part 18 carries the tooth and it is pivoted to one pair of outer links, and the other part 19 is pivoted to the next pair of outer links. The turnbuckle screws engage with screwthreaded holes 21 in the parts 18 and 19, and all the links are secured tightly to the spider by screwing up the turnbuckle. The links and their teeth can be removed from and replaced on the spider as often as they become worn or broken or require to be sharpened.

The teeth may be made in a great many different forms in carrying out this invention. They may be curved or straight, and they are preferably of greater width across the points of the teeth of the outer links than the enlargements of the spider so that the dirt does not accumulate between the arms of the spider.

What I claim is:

1. An earth working element, comprising a central support provided with radial projections, and links pivotally connected together and secured under tension in the form of a ring around the said support in constant engagement with the said projections, said links being provided with earth working teeth.

2. An earth working element, comprising a central support formed of separable sections detachably secured together, and pivoted links secured around the said support and provided with teeth.

3. An earth working element, comprising a spider provided with radial arms having enlargements at their ends and lugs which project from the enlargements, and pivoted links detachably secured together around the spider and engaging with the enlargements and lugs, said links being provided with earth working teeth.

4. An earth working element, comprising a central support, middle links and outer links pivoted together and detachably secured around the said support, said links being provided with earth working teeth which are widest at their points and the teeth of the outer links being formed right and left and projecting laterally of the said support.

5. An earth working element, comprising a central support, and pivoted links arranged around the said support and provided with teeth, one of the said links being formed of two end portions connected together by a turnbuckle which clamps all the said links upon the support.

In testimony whereof I have affixed my signature.

HENRY OSBERT SCRANTON.